(12) United States Patent
Wronski et al.

(10) Patent No.: US 12,633,031 B2
(45) Date of Patent: May 19, 2026

(54) STOCHASTIC TEXTURE FILTERING

(71) Applicant: NVIDIA Corporation, Santa Clara, CA (US)

(72) Inventors: Bartlomiej Wronski, Brooklyn, NY (US); Matthew Milton Pharr, Oakland, CA (US); Marco Salvi, Kirkland, WA (US)

(73) Assignee: NVIDIA Corporation, Santa Clara, CA (US)

( * ) Notice: Subject to any disclaimer, the term of this patent is extended or adjusted under 35 U.S.C. 154(b) by 186 days.

(21) Appl. No.: 18/413,564

(22) Filed: Jan. 16, 2024

(65) Prior Publication Data

US 2024/0371072 A1 Nov. 7, 2024

Related U.S. Application Data

(60) Provisional application No. 63/499,632, filed on May 2, 2023.

(51) Int. Cl.
G06T 15/04 (2011.01)
(52) U.S. Cl.
CPC ................................... G06T 15/04 (2013.01)
(58) Field of Classification Search
CPC ....................................................... G06T 15/04
See application file for complete search history.

(56) References Cited

U.S. PATENT DOCUMENTS 6,924,814 B1 * 8/2005 Ephanov ................. G06T 15/04
345/582

11,727,621 B2 * 8/2023 Wolfe ....................... G06T 5/60
345/419
2015/0091931 A1 * 4/2015 Pelton ................... G06T 11/001
345/582

OTHER PUBLICATIONS

Chao, M., et al., "A general purpose unequal probability sampling plan," Biometrika 69, 3 (Dec. 1982), 653-656.
Clarberg, P., et al., "Real-Time Path Tracing and Beyond," HPG 2022 Keynote, Jul. 2022.
Cook, R., "Stochastic sampling in computer graphics," ACM Transactions on Graphics 5, 1 (Jan. 1986), 51-72.

(Continued)

*Primary Examiner* — Xiao M Wu
*Assistant Examiner* — Ryan Allen Barham
(74) *Attorney, Agent, or Firm* — Leydig, Voit & Mayer, Ltd.

(57) ABSTRACT

Stochastic texture filtering introduces randomness into texel sampling and/or filtering. Instead of computing a closest texel for the texture coordinates, randomness is introduced by stochastic sampling to obtain one texel. Stochastic sampling is also applied for filtering the texels when multiple samples are used and/or to perform temporal filtering. A first technique is used for discrete filters and filter-specific sample weights are generated. In contrast with conventional techniques, the sample weights are not applied directly to the single texel value. The single texel is randomly selected for each pixel, with probability proportional to an associated sample weight. A second technique is used for continuous filters and weights are not generated. Instead, the texture coordinates are perturbed with a random offset, which is drawn from a filter-specific probability distribution. Stochastic texture filtering improves the performance of texture filtering in terms of speed and quality and is compatible with image reconstruction techniques.

23 Claims, 14 Drawing Sheets

Probability Distribution 205
Random Offset 215
Sample Texel 235
Sample Texel 245

(56)         References Cited

OTHER PUBLICATIONS

Ernst, M., et al., "Filter importance sampling," In Proceedings of IEEE Symposium on Interactive Ray Tracing (Sep. 2006), pp. 125-132.

Enderton, E., et al., "Stochastic transparency," In Proceedings of the ACM SIGGRAPH Symposium on Interactive 3D Graphics and Games (2010), pp. 157-164.

Georgiev, I., et al., "Blue-noise dithered sampling," In ACM SIGGRAPH Talks (2016), ACM Press, pp. 35:1-35:1.

Greene, N., et al., "Creating raster Omnimax images from multiple perspective views using the elliptical weighted average filter," IEEE Computer Graphics and Applications 6, 6 (1986), 21-27.

Heckbert, P., "Survey of texture mapping," IEEE Computer Graphics and Applications 6, 11 (1986), 56-67.

Heckbert, P., "Fundamentals of Texture Mapping and Image Warping," PHD thesis, UC Berkeley,. Jun. 1989.

Hofmann, N., et al., "Interactive path tracing and reconstruction of sparse volumes," Proc. ACM Comput. Graph. Interact. Tech. 4, 1 (Apr. 2021).

Karis, B., "High-quality temporal supersampling," Advances in Real-Time Rendering in Games, SIGGRAPH Courses 1, 10.1154 (2014).

Lee, M., et al., "Vectorized production path tracing," In Proceedings of High Performance Graphics (NY, NY, USA, 2017), Association for Computing Machinery.

Liu, E., "DLSS 2.0—Image Reconstruction for Real-Time Rendering with Deep Learning," In Game Developers Conference (2022).

Ogaki, S., "Vectorized reservoir sampling," In SIGGRAPH Asia 2021 Technical Communications (2021), Association for Computing Machinery.

Stachowiak, T., "Stochastic screen-space reflections," In Advances in Real-Time Rendering in Games, Part I (2015), ACM SIGGRAPH Courses.

Williams, L., "Pyramidal parametrics," Computer Graphics (Proceedings of SIGGRAPH) 17, 3 (Jul. 1983), 1-11.

Wyman, C., et al., "Hashed alpha testing," In Proceedings of the 21st ACM SIGGRAPH Symposium on Interactive 3D Graphics and Games (2017), pp. 7:1-7:9.

Wolfe, A., et al., "Spatiotemporal blue noise masks," In Eurographics Symposium on Rendering (2022), pp. 117-126.

Yang, L., et al., "A Survey of Temporal Antialiasting Techniques," Computer Graphics Forum 39, 2 (2020), pp. 607-621.

* cited by examiner

| | | | |
|------|------|------|------|
| 0.0 | 0.1 | 0.1 | 0.0 |
| 0.0 | 0.2 | 0.2 | 0.1 |
| 0.1 | 0.1 | 0.2 | 0.1 |
| 0.0 | 0.1 | 0.1 | 0.0 |

Fig. 1B

| | | | |
|------|------|------|------|
| 0% | 10% | 10% | 0% |
| 0% | 20% | 20% | 10% |
| 10% | 10% | 20% | 10% |
| 0% | 10% | 10% | 0% |

Fig. 1C

Sample Texel
110

| | | | |
|------|------|------|------|
| 0% | 10% | 10% | 0% |
| 0% | 20% | 20% | 10% |
| 10% | 10% | 20% | 10% |
| 0% | 10% | 10% | 0% |

Sample Texel
120

| | | | |
|------|------|------|------|
| 0% | 10% | 10% | 0% |
| 0% | 20% | 20% | 10% |
| 10% | 10% | 20% | 10% |
| 0% | 10% | 10% | 0% |

Fig. 1D

Receive texture coordinates associated with rendered geometry that intersects a pixel
255

Calculate integer texture coordinates for a texel stored in a texture map using the texture coordinates and a stochastic value that is based on a texture filter
260

Produce a filtered color for the pixel based on the texel
265

To/From XBar 370

GPC 350

Pipeline Manager 410

PROP 415

MPC 430

Primitive Engine 435

SM 440

DPC 420(V)

Raster Engine 425

WDX 480

MMU 490

To/From XBar 370

To/From XBar 370

555

STOCHASTIC TEXTURE FILTERING

CLAIM OF PRIORITY

This application claims the benefit of U.S. Provisional Application No. 63/499,632 titled "Stochastic Texture Filtering," filed May 2, 2023, the entire contents of which is incorporated herein by reference.

BACKGROUND

Two-dimensional (2D) image texture maps are essential to rich surface detail in most rendered images. Three-dimensional (3D) voxel grids play a similar role for volumetric effects like clouds, smoke, and fire, allowing detailed offline physical simulations to be used. The 2D image texture maps and 3D voxel arrays are widely used to add rich detail to the surfaces and volumes of rendered scenes, and filtered texture lookups are integral to producing high-quality imagery. Conventional high performance (in terms of quality and speed) texture filtering relies on precise computations that typically consume computation, power, and bandwidth resources. There is a need for addressing these issues and/or other issues associated with the prior art.

SUMMARY

Embodiments of the present disclosure relate to stochastic texture filtering. Systems and methods are disclosed that enable efficient implementation of high-quality texture filters and efficient filtering of textures. Conventional texture mapping samples a texture map using an integer portion of the texture map coordinates to read multiple closest texels and applies a weight based on the non-integer portion of the texture map coordinates to each texel. The weighted texels are then combined according to a filter function to produce a color for each pixel.

In contrast to conventional texture map filtering, stochastic texture filtering introduces randomness into the texel sampling and/or filtering. Instead of computing a closest texel for the texture coordinates, randomness is introduced by stochastic sampling to obtain one texel. Stochastic sampling is also applied for filtering the texels when multiple samples are used and/or to perform temporal filtering. A first technique is used for discrete filters and filter-specific sample weights are generated. In contrast with conventional techniques, the sample weights are not applied directly to the single texel value. The single texel is randomly selected for each pixel, with probability proportional to an associated sample weight. A second technique is used for continuous filters and weights are not generated. Instead, the texture coordinates are perturbed with a random offset, which is drawn from a filter-specific probability distribution Stochastic texture filtering improves the performance of texture filtering in terms of speed and quality and is compatible with image reconstruction techniques such as DLSS (deep learning super sampling).

In an embodiment, the method includes receiving texture coordinates associated with rendered geometry that intersects a pixel, calculating integer texture coordinates for a texel stored in a texture map using the texture coordinates and a stochastic value that is based on a texture filter, and producing a filtered color for the pixel based on the texel.

BRIEF DESCRIPTION OF THE DRAWINGS

The present systems and methods for stochastic texture filtering are described in detail below with reference to the attached drawing figures, wherein:

FIG. 1B illustrates sixteen texels and associated sample weights, in accordance with an embodiment.

FIG. 1C illustrates sixteen texels and associated sample weight probabilities, in accordance with an embodiment.

FIG. 1D illustrates stochastically selected texels and associated sample weight probabilities, in accordance with an embodiment.

DETAILED DESCRIPTION

Systems and methods are disclosed related to stochastic texture filtering. Stochastic texture filtering introduces randomness into the texel sampling and/or filtering. Instead of computing a closest texel for the texture coordinates, randomness is introduced by stochastic sampling to obtain one texel. Stochastic sampling is also applied for filtering the texels when multiple samples are used and/or to perform temporal filtering. A first technique is used for discrete filters and filter-specific sample weights are generated. In contrast with conventional techniques, the sample weights are not applied directly to the single texel value. The single texel is randomly selected for each pixel, with probability proportional to an associated sample weight. A second technique is used for continuous filters and weights are not generated. Instead, the texture coordinates are perturbed with a random offset, which is drawn from a filter-specific probability distribution Stochastic texture filtering improves the performance of texture filtering in terms of speed and quality and is compatible with image reconstruction techniques such as DLSS (deep learning super sampling).

Figure 1A:
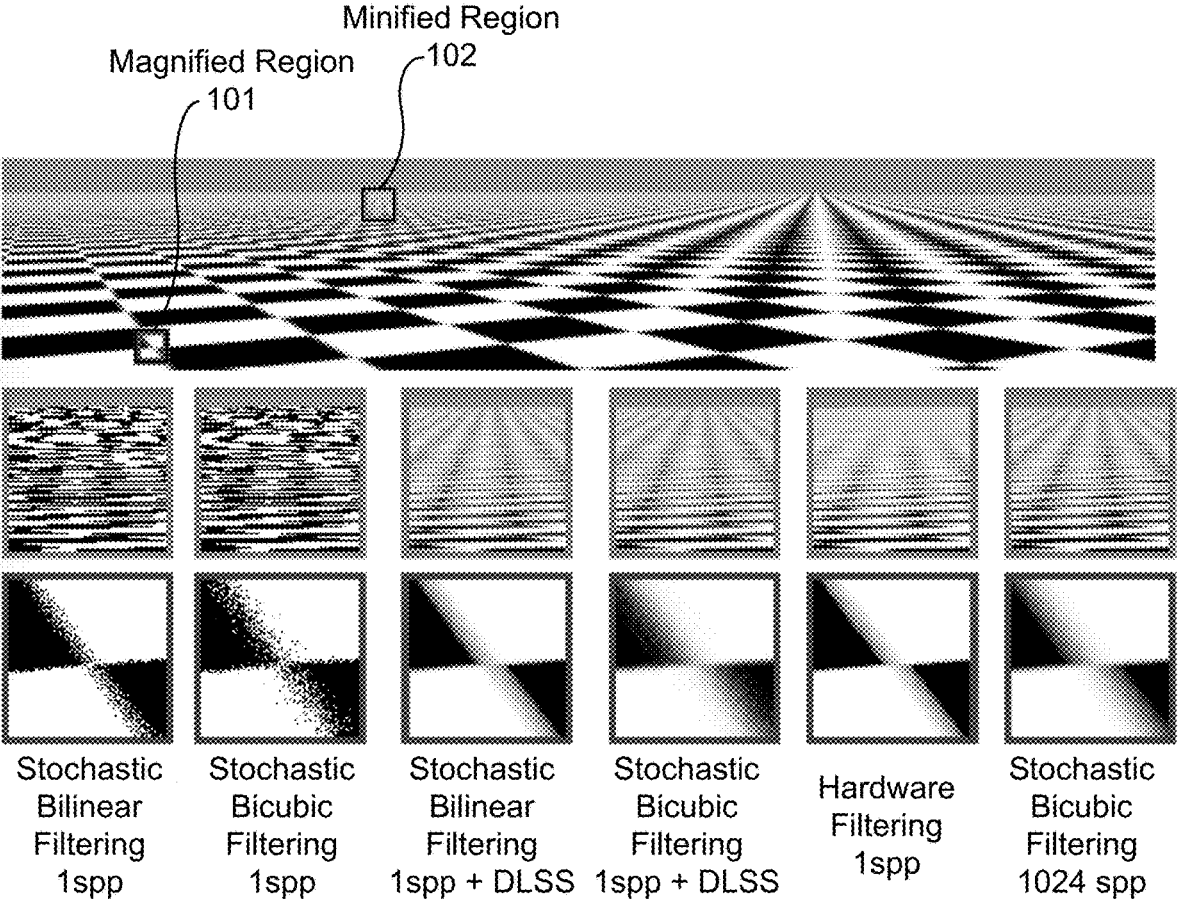
FIG. 1A illustrates a checkerboard texture rendered onto a plane using stochastic texture filtering for various filtering modes, in accordance with an embodiment.

FIG. 1A illustrates a checkerboard texture rendered onto a plane using stochastic texture filtering for various filtering modes, including bilinear and bicubic filtering. A magnified region 101 and a minified region 102 filtered using the various techniques are shown in a second and third row, respectively. For each pixel on a plane to which the checkerboard texture is applied, a single texel is sampled. A texel location, specified by (u,v) coordinates, is associated with geometry visible in the pixel and provided as an input. Various sources of randomness are available as an additional input for determining integer coordinates for the single texel. Magnification is handled using filter importance sampling.

On the left of FIG. 1A, stochastic bilinear filtering and stochastic bicubic filtering is applied to one sample per pixel (1 spp), producing an incoherent texture for the minified region 102 (middle row) and a grainy texture for the magnified region 101 (bottom row). Use of DLSS improves the image quality, providing quality similar to hardware supported (HW) anisotropic filtering using stochastic bicubic filtering with 1024 spp that produces a high-quality reference image, shown in the rightmost images. Images reconstructed using DLSS are temporally stable, with occasional flickering in regions containing very high-frequency details. In motion, sporadic ghosting and other temporal artifacts introduced by DLSS are observed, but the overall image quality remains comparable to HW anisotropic filtering. Although DLSS doesn't completely remove noise caused by stochastic texture sampling, spatiotemporal blue noise reduces the noise, making it barely perceptible in magnified high-contrast areas.

In the center of FIG. 1A, stochastic bilinear filtering and stochastic bicubic filtering is applied at one sample per pixel (1 spp) and DLSS is used, producing a coherent texture for the minified region 102 (middle row) and a antialiased texture for the magnified region 101 (bottom row). When the stochastic bilinear and bicubic filtering is used with DLSS, the results are very similar to the high-quality reference images. In sum, temporal reconstruction with stochastic texture filtering is effective in recovering a high-quality anisotropically filtered image while only using 1 spp.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Textures are given as discrete, uniformly-spaced samples. Filtering texture lookups is challenging since each access generally requires a spatially-varying anisotropic filter that accesses multiple source texture samples. Two main types of texture filtering may be used: interpolation for translation and magnification, and lowpass filtering for minification. For both texture filtering types, the notation of a filter function $f$ is defined over the texture-space coordinates domain $R^n \rightarrow R$ and (u, v, . . . ) as its inputs. Without loss of generality, a simplified, two-dimensional notation is used due to the separability of the sampling process. The filtered texture value is an integral of the product off and the texture lookup function t:

$$F = \int f(u, v)t(u, v)dudv. \qquad \text{Eq. (1)}$$

The texture function t is defined everywhere, but is non-zero only at discrete locations (typically uniform grid) due to impulse train sampling.

Two different techniques may be used to perform stochastic texture filtering based on the integral of Equation (1). A first technique is used for discrete filters and sample weights are generated. However, in contrast with conventional techniques, the sample weights are not applied directly to the single texel (texture value). Instead, in an embodiment, a list of texel coordinates and associated sample weights is generated for a given discrete filter. A single texel is randomly selected for each pixel, with probability proportional to a texel weight, FIG. 1B illustrates sixteen texels and associated sample weights, in accordance with an embodiment. When 1 spp is used, one of the sixteen texels will be sampled. In an embodiment, the list of texel coordinates and weights are not all stored in memory. In an embodiment, reservoir sampling is used to compute individual texel weights. For each texel, a decision is randomly made whether to discard the sampled texel or to replace the current texel with the sampled texel.

FIG. 1C illustrates sixteen texels and associated sample weight probabilities, in accordance with an embodiment. The sample weights shown in FIG. 1B are converted into the probabilities shown in FIG. 1C. After all texels have been processed for multiple samples and/or frames, the texels will each be selected with probability proportional to their associated weight. While the sample weight is not directly applied to the selected texel, a larger sample weight will cause the associated texel to be selected more frequently, and when averaged over many iterations, the resulting texel will converge to the correct estimated value.

FIG. 1D illustrates stochastically selected texels and associated sample weight probabilities, in accordance with an embodiment. For first and second frames (or different samples for a pixel in the same image or frame), sample texels 110 and 120 associated with 20% and 10% probabilities, respectively, are selected. Over several frames, the texels associated with 20% probability will be stochastically selected more frequently compared with the texels associated with 10% or 0% probability. In contrast with conventional texture filtering, there is no explicit weighting of texels or combination of texel values according to a filter function. In an embodiment, texel values are averaged when multiple samples are used and/or to perform temporal filtering. The texture filtering being used (in the limit) is determined by the sample weight values associated with the texels.

The sample weights for discrete texture filtering may be generated for separable functions, weighted sums, uniform sample reuse, sampling arrays, weighted reservoir sampling, positivization, and the like. In the following, denotes uniform random variables in [0,1) and angled brackets to denote expectation. For separable functions, an n-dimensional function that is a product of one-dimensional (1D) functions can be sampled by independently sampling each dimension. Many filters used for textures, including Gaussian and polynomials (linear, cubic, etc.) are separable. For weighted sums the simplest texture filtering function $f$ can be represented as a set of discrete weights w defined for multiple discrete texture samples t. Given normalized weights $w_i$ and texture values $t_i$, the filtered texture value is given by $$F = \sum\nolimits_{i=1}^{n} w_i t_i \qquad \text{Eq. (2)}$$

If a term j of the sum is sampled with probability equal to $w_j$, then an unbiased estimate of F is given by the corresponding texture value, unweighted:

$$\langle F \rangle = t_j. \qquad \text{Eq. (3)}$$

Under the assumption that $w_i$ are normalized, this is a special case of sampling a term according to probabilities $p_i \propto w_i$, and applying the standard Monte Carlo estimator $$f_j/p_j.$$

The weights $w_i$, are often not normalized, and so must be normalized to find weights $$\tilde{w}_i = w_i / \sum\nolimits_{j} w_j$$

before filtering. However, in this case, normalization may be skipped, and j may be sampled with probability proportional to $w_i$ and Equation (3) may be applied to get the correct result.

In an embodiment, a single 1D random number is used for sampling each dimension and is remapped to a fresh uniform sample for each dimension to perform uniform sample reuse. Whenever a 1D random variable $\xi$ is used to make a discrete sampling decision based on a probability p, then a new independent random variable $\xi' \in [0,1)$ can be derived from $\xi$:

$$\xi' = \begin{cases} \dfrac{\xi}{p} & \text{if } \xi < p \\ \dfrac{\xi - p}{1 - p} & \text{otherwise} \end{cases} . \qquad \text{Eq. (4)}$$

This technique can be useful when is well-distributed (e.g., with a blue noise spectrum or with low discrepancy), allowing additional dimensions to benefit from $\xi$'s distribution as well as saving the cost of generating additional random samples.

For a sampling array, an array of weights w, (as from Equation 2) can be sampled by summing the weights and selecting the first item j where $$\xi < \sum\nolimits_{j}^{n} w_j / \sum\nolimits_{i}^{n} w_i.$$

For weighted reservoir sampling storing or recomputing all of the weights $w_i$ may be undesirable, especially on GPUs. Weighted reservoir sampling with sample reuse can be applied with weights generated sequentially.

Although negative weights can be sampled with probability based on their absolute value, doing so does not reduce variance as well as importance sampling does with positive functions. All interpolating filters of a higher order than the linear filter have negative lobes and being able to estimate them with low variance is essential for stochastic texture filtering. Positivization may be used, partitioning the filter weights $w_i$, into positive $$(w_i^+)$$

and negative $$(w_i^-)$$

sets and sampling once from each set. Given respective sample indices $j^+$ and $j^-$, the estimator of the filtered texture value of Equation (2) is $$\langle F \rangle = \sum\nolimits_{i} w_i^+ t_{j^+} - \sum\nolimits_{i} w_i^- t_{j^-}. \qquad \text{Eq. (5)}$$

If the original filter was normalized, the resulting positive and negative parts will not be normalized, and if Equation (2) is used, both sums need to be weighted.

A second technique is used for continuous filters (without discretization) and weights are not generated. Instead the (u, v) coordinates are perturbed with a random (u', v') offset, which is drawn from a probability distribution. The choice of distribution used to draw random offsets ultimately determines the effective texture filtering (once again, in the limit, after accumulating many samples).

Figure 2A:
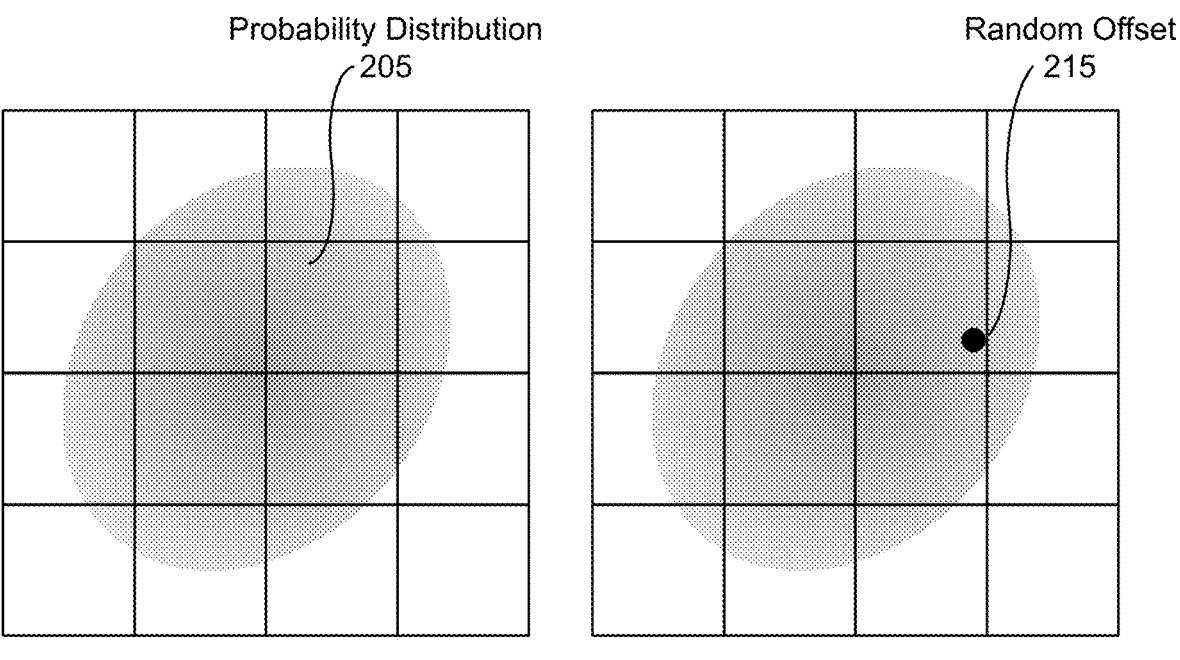
FIG. 2A illustrates continuous distribution sampling, in accordance with an embodiment.

FIG. 2A illustrates continuous distribution sampling, in accordance with an embodiment. A probability distribution 205 is used to determine the random offset that is applied to the texture coordinates. Texture coordinates are offset using a random offset 215 that is drawn from the probability distribution 205.

Figure 2B:
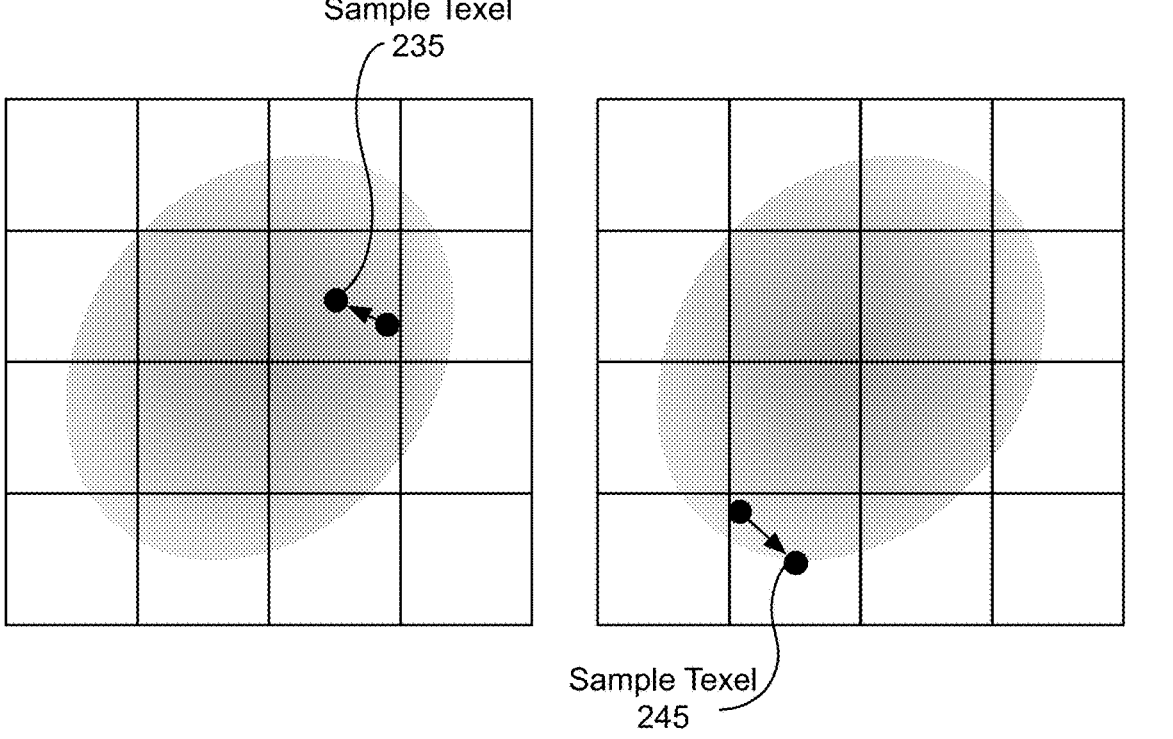
FIG. 2B illustrates texel sampling using random u,v offsets, in accordance with an embodiment.

FIG. 2B illustrates texel sampling using random u,v offsets, in accordance with an embodiment. A sample texel 235 is selected for offset texture coordinates corresponding to the random offset 215. A sample texel 245 is selected for offset texture coordinates corresponding to another random offset drawn from the probability distribution 205 and no weights are used.

For a filtering operation given by the product of a normalized continuous convolutional filter $f(u, v)$ with a texture $t(u, v)$ expressed in the form of Equation (1), an unbiased estimate of F can be found using filter importance sampling (FIS): (u',v') is sampled from $f(u, v)$'s distribution and the standard Monte Carlo estimator is applied, giving (F)=t(u', v'). This approach is appealing for stochastic texture filtering since it allows for filters with infinite spatial support and doesn't have a cost that necessarily scales with the filter's width. The FIS framework can be used with positivization for low variance evaluation of filters with negative lobes.

Filter importance sampling a screen-space reconstruction filter can effectively approximate a minification filter, such as an anisotropic filter. However, FIS is not sufficient to perform UV jittering for magnification, as it would produce nearest-neighbor interpolated texture and visual artifacts. FIS may be used for texture reconstruction and sampling in addition to screen-space reconstruction filtering.

FIS assumes the integration of a product of two continuous functions. When using FIS to filter discrete samples, a practical realization draws a sample x' from $f$ and then selects the closest texel $[x'+\frac{1}{2}]$. For n-dimensional filtering, this corresponds to applying a box reconstruction filter over $[-\frac{1}{2},\frac{1}{2}]^n$ to the texture to make a continuous function t(x). Equivalently, applying the box reconstruction filter corresponds to convolving the original filter function $f$ with a box filter, changing the shape of the filter function. Thus, the filter function that is sampled should be the deconvolution of the desired filter with the box function. This perspective provides a better understanding of Hofmann et al.'s stochastic trilinear sampling algorithm, which is based on independent, uniform jittering in each dimension and then applying nearest neighbor sampling. The jittering corresponds to applying FIS to sample the box filter which is then convolved with another box function, giving a stochastic trilinear interpolant.

Thus, a B-spline filter of degree n may be filtered by sampling a spline of degree n−1 and performing a nearest lookup, since approximating B-splines are constructed by repeated convolution of a box filter via the Cox-de Boor recursion formula. For example, a quadratic B-spline filter can be achieved by sampling a triangular probability density function (PDF) over $[-1.5, 1.5]^2$. Sampling can either be performed via cumulative distribution function (CDF) inversion or by adding n uniformly-distributed random variables.

The additional box function can be useful for rapidly changing filters such as a small-sigma Gaussian: evaluating it at discrete points results in subsampling error and the correction requires evaluating the erf error function. Filter importance sampling a regular, analytical normal distribution produces the same effect due to the convolution of nearest-neighbor box function with the Gaussian. Furthermore, a Gaussian convolutional filter is an example of an infinite filter that is truncated in practice. With FIS, it is possible to evaluate an infinite filter by sampling the filter without truncation. This can simplify implementation (it is not necessary to carefully window the filter), as well as saving the computational cost of multiple discrete weight evaluations and sample selection.

Figure 2C:
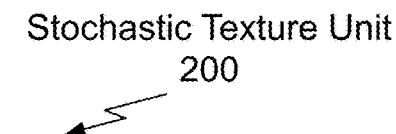
FIG. 2C illustrates a block diagram of an example stochastic texture filtering system suitable for use in implementing some embodiments of the present disclosure.
Figure 2C:
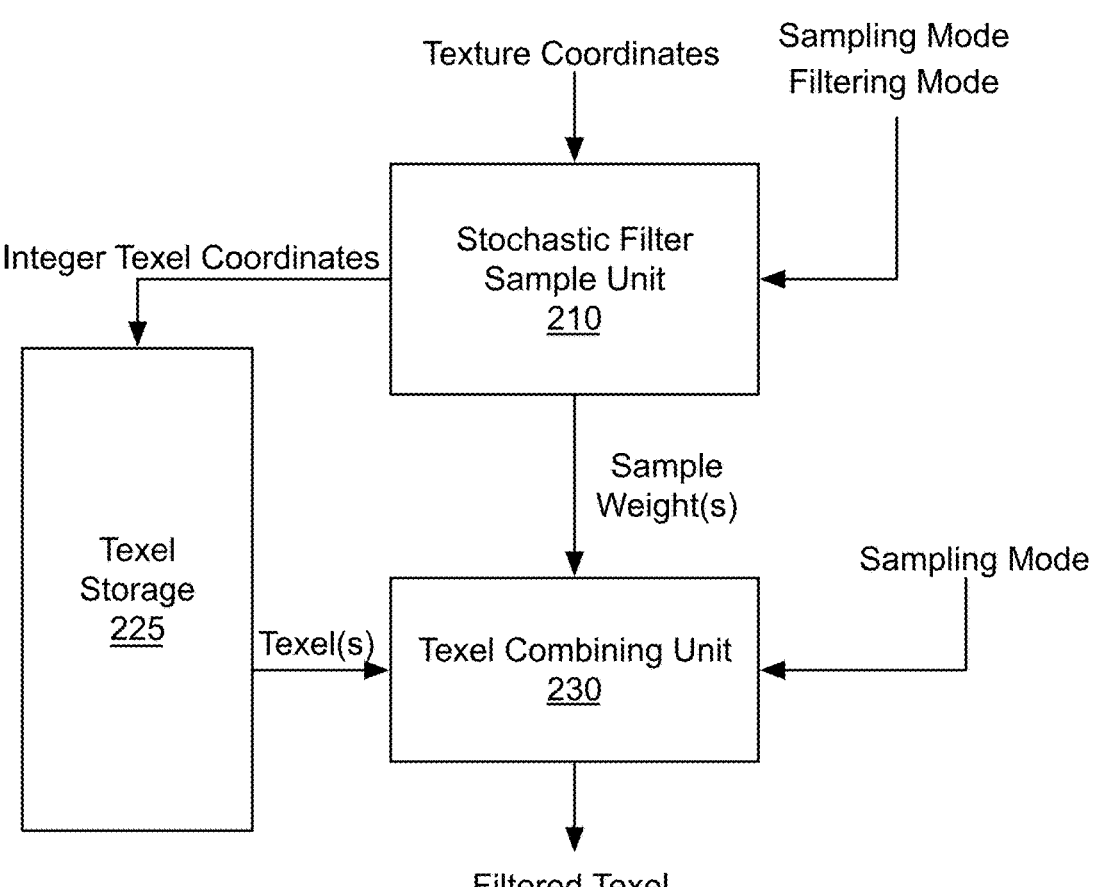

Hardware support for stochastic texture filtering, using discrete and/or continuous filter functions, may be implemented within a texture map unit. FIG. 2C illustrates a block diagram of an example stochastic texture unit 200 suitable for use in implementing some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the stochastic texture unit 200 is within the scope and spirit of embodiments of the present disclosure.

The stochastic texture unit 200 includes a stochastic filter sample unit 210, texture combining unit 230, and interfaces to a texel storage 225. In an embodiment, the texel storage 225 is a cache hierarchy backed by a local on or off device memory storage. The stochastic texture unit 200 receives texture coordinates for a pixel. When multiple texels are sampled for each pixel, texture coordinates may be received for each sample. The stochastic texture unit 200 computes a filtered texel (color) for each pixel. A sampling mode (number of samples per pixel) and filtering mode (discrete or continuous) may be specified for each texture map or provided via an instruction (per texture/object/image/etc.).

The sampling mode and filtering mode may contribute to computations of stochastic random values, sample weights, and texel coordinates (for one or more texels per pixel). The filtering mode specifies the discrete or continuous filter modes and the sample weights or probability distribution, respectively. The stochastic filter sample unit 210 computes the integer texel coordinates for each texel according to the sampling and filtering modes. The sampling mode may define sampler state for controlling the number of texels selected and the coordinate computation, where the sampler state may comprise spp, maximum degree of anisotropy in mip level selection (e.g., from 16 to 64 or higher for improved minification filter quality), and selecting from a number of built in filters, including but not limited to polynomial (e.g., cubic B-spline or Mitchell filter) or the Gaussian filter. The sampling mode may define sampler state for using an average value of the entire texture to stochastically skip texel fetches entirely. The sampling mode may define sampler state for providing a texture priority number for adjusting the degree of stochasticity to maintain performance, so that when performance drops textures with lower priority are more aggressively sampled stochastically.

In an embodiment, the filtering mode may define a filter kernel for stochastic sampling using a number of polynomial coefficients (e.g., cubic B-spline polynomial, Mitchell polynomial, and the like). In an embodiment, the filtering mode may define a filter kernel for stochastic sampling using a parametric function (e.g., Gaussian, windowed sine, B-spline, program, etc.) with a number of user-specified coefficients that control the function's shape. In an embodiment, the filtering mode may define a filter kernel for stochastic sampling by a user-provided lookup table. In an embodiment, the filtering mode may define a filter kernel for stochastic sampling via a program that is executed to compute texture filtering coefficients at a specified lookup point. In an embodiment, the same filter kernel is used for all texture dimensions. In an embodiment, independent filter kernels are specified for each texture dimension.

The filtering mode may also specify a sampling filter, such as using weighted reservoir sampling to sample from a set of filter weights or filter importance sampling to sample an analytic filter function. When FIS is used with a Gaussian filter, better results may be produced with narrow filters that would otherwise "fall between the samples." The filtering mode may also specify the use of positivization to sample filters with negative coefficients, randomly selecting between the positive and negative samples, reweighting the samples such that the result remains correct in expectation. The filtering mode may also specify stochastic sampling of a single texture level of detail (LOD) for 1-3D textures, such as stochastic quadrilinear sampling for MIP mapped 3D textures or stochastic sampling may be specified via a "jitter" value provided by the user that is added to the hardware LOD before the LOD is rounded to an integer MIP level. The filtering mode may also enable/disable clamping of highly anisotropic filters.

The stochastic filter sample unit 210 obtains a random number for stochastic texture sampling (reading an approximate texel instead of computing the "correct" texel) and/or stochastic texture filtering (via the sample weights). The random number may be provided by a user, hardware-generated, or read from a table (fixed or programmed). The random number may be a low-discrepancy random number or selected from a particular distribution (e.g., spatiotemporal blue noise). A single 1D random sample may be used for sampling all dimensions, remapping the 1D random sample to a fresh uniform sample in [0,1) after each dimension is sampled.

In an embodiment, the integer texel coordinates associated with a sample weight are selected, where the sample weight is stochastically selected with a probability proportional to the sample weights for the discrete filter. In an embodiment, a random offset (u', v') is drawn from a distribution and summed with the fractional (u, v) to produce integer texture map coordinates.

The texel combining unit 230 receives texels from the texel storage 225 and the sampling mode. When multiple samples are used for a pixel, the texels are combined to produce a filtered texel for each pixel. When a single texel is read for each pixel, the texel combining unit 230 simply outputs the texel read from the texel storage 225 as the filtered texel.

Equation (8) describes how randomness may be used for a linear filter. More specifically, direct application of sampling using an array of weights and then Equation (3) gives the following estimator for linear interpolation over [0,1], $lerp(v_0, v_1, t)=(1-t) \, v_0 + tv_1$:

$$\langle lerp \rangle = \begin{cases} v_0 & \text{if } \xi > t \\ v_1 & \text{otherwise} \end{cases} \qquad \text{Eq. (8)}$$

Bilinear interpolation of values at the four corners of the unit square, $bilerp(v_{00}, v_{10}, v_{01}, v_{11}, s, t)$, can be implemented with nested linear interpolations. Applying the same approach and reusing the sample, results in:

$$\langle bilerp \rangle(s, t) = \begin{cases} v_{00}, & \text{if } \xi > s \text{ and } \dfrac{\xi - s}{1 - s} > t \\ v_{01}, & \text{if } \xi > s \text{ and } \dfrac{\xi - s}{1 - s} \leq t \\ v_{10}, & \text{if } \xi \leq s \text{ and } \xi/s > t \\ v_{11}, & \text{otherwise} \end{cases} \qquad \text{Eq. (9)}$$

It is straightforward to extend the estimator to trilinear interpolation, as used with MIP mapping and 3D voxel grids. More generally, the technique can be applied to n-dimensional interpolation, reducing from $2^n$ texture lookups to a single lookup.

Figure 2D:
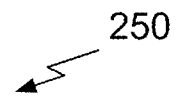
FIG. 2D illustrates a flowchart of a method for stochastic texture filtering, in accordance with an embodiment.
Figure 2D:
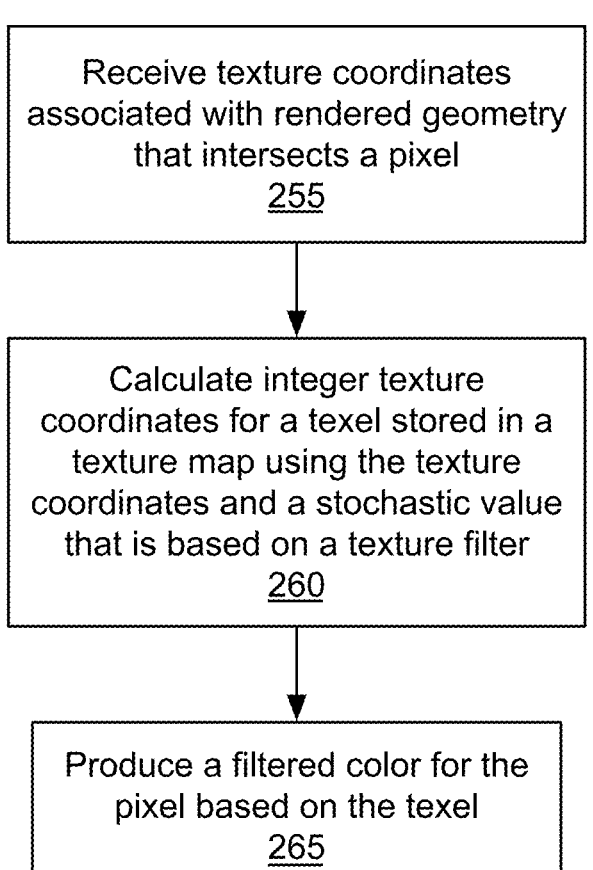

FIG. 2D illustrates a flowchart of a method 250 for stochastic texture filtering, in accordance with an embodiment. Each block of method 250, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 250 is described, by way of example, with respect to the stochastic texture unit 200 of FIG. 2C. However, this method may additionally or alternatively be executed by any one system, or any combination of systems, including, but not limited to, those described herein. Furthermore, persons of ordinary skill in the art will understand that any system that performs method 250 is within the scope and spirit of embodiments of the present disclosure.

At step 255, texture coordinates associated with rendered geometry that intersects a pixel are received. In an embodiment, the texture coordinates comprise integer and fractional (non-integer) components. In an embodiment, a driver replaces texture processing code with the instructions for stochastic texture filtering. At step 260, integer texture coordinates for a texel stored in a texture map are calculated using the texture coordinates and a stochastic value that is based on a texture filter. In an embodiment, the texture map is designated as safe for stochastic filtering and stochastic filtering is enabled for the texture map. In an embodiment, the stochastic value is summed with the texture coordinates before the integer texture coordinates are calculated. In an embodiment, the stochastic value is a low-discrepancy random number or is selected from a particular distribution. In an embodiment, the stochastic value is provided by a user, hardware-generated, or read from a table. In an embodiment, additional integer texture coordinates are calculated for at least one additional texel stored in the texture map using the texture coordinates and an additional stochastic value. In an embodiment, a number of the at least one additional texel varies based on a frame rate.

In an embodiment, the texture filter comprises one of a cubic B-spline polynomial, Mitchell polynomial, Gaussian, parametric, or program. In an embodiment, the calculating comprises generating a set of sample weights for a discrete filter, where each sample weight is associated with integer texel coordinates corresponding to the texture coordinates, selecting the one sample weight using the stochastic value, and setting the integer texture coordinates to the integer texel coordinates associated with the one sample weight. At step 265, a filtered color is produced for the pixel based on the texel. In an embodiment, producing the color comprises combining multiple texels for the pixel over time.

In an embodiment, a number of texels read from the texture map for the pixel using the texture coordinates and additional stochastic values is dynamically adjusted based on a target framerate. In an embodiment, at least one of steps 255, 260, or 265 are performed on a server or in a data center to generate an image, and the image is streamed to a user device. In an embodiment, at least one of steps 255, 260, or 265 are performed within a cloud computing environment. In an embodiment, at least one of steps 255, 260, or 265 are performed for training, testing, or certifying a neural network employed in a machine, robot, or autonomous vehicle. In an embodiment, at least one of steps 255, 260, or 265 are performed on a virtual machine comprising a portion of a graphics processing unit.

In an embodiment, upon receiving a stochastic texturing request or a driver hint, the driver replaces traditional texture operations with code that performs stochastic texture filtering either in shader code or using new hardware instructions. In an embodiment, the driver computes how much each texture map varies and uses that to automatically set the degree of stochastic filtering to be performed, such that the less variation, the more aggressively the texture is stochastically sampled. In an embodiment, the driver detects that a user is performing stochastic texture sampling (either by direct enabling of an exposed feature or by compiler analysis of shader code) and changes the DLSS mode and/or configuration accordingly. In an embodiment, the driver detects a DLSS version and user settings and adjusts the stochastic filtering quality and performance accordingly. In an embodiment, the shader compiler detects blending among multiple textures (e.g., triplanar mapping or more general material neural networks) and converts the blending operations to stochastic filtering, performing only a single texture lookup.

In an embodiment, disocclusions are detected when the camera or objects move from frame to frame and, upon detection, non-stochastic texel lookups (or multi-sample stochastic) are performed for higher quality initial results. For example, in an embodiment, in response to detecting a disocclusion, an additional texel is read from the texture map using the texture coordinates and an additional stochastic value and combined with the texel to produce the filtered color. In an embodiment, performance-driven stochastic sampling is performed by dynamically adjusting the number of samples taken for each pixel to maintain a target framerate. In an embodiment, because stochastic texturing causes noise in albedo maps, etc., guide buffer denoising is performed before guide buffers are provided to DLSS. In an embodiment, DLSS is trained with noisy guide buffers.

In an embodiment, stochastic filtering is automatically enabled for textures that are known to be safe to sample stochastically. In an embodiment, textures may be manually designated as "known safe" for a particular title. In an embodiment, textures may be inferred as "known safe" based on a filename. In an embodiment, the shader compiler performs dataflow analysis on how texels are used and applies stochastic sampling if the texels make an affine contribution to the final result. In an embodiment, upon loading a texture, the texture content is optimized for a given kernel (such as an interpolating bicubic) to provide higher quality stochastic results at a lower computational cost.

In sum, stochastic texture filtering reduces memory bandwidth usage without an equivalent reduction in image quality. Decoding only a single source texel at each lookup, enables the use of computationally expensive compressed texture representations (traditional, sparse, or neural compressed). Image quality may be improved through the use of high quality filtering by the use of high-quality and higher-order interpolating and approximating texture filters at a lower computational cost compared with conventional bilinear filtering. Furthermore, additional noise introduced by stochastic filtering in offline rendering is negligible. In real-time rendering, the noise may be effectively suppressed by using spatiotemporal reconstruction algorithms and blue-noise sampling patterns.

Parallel Processing Architecture

Figure 3:
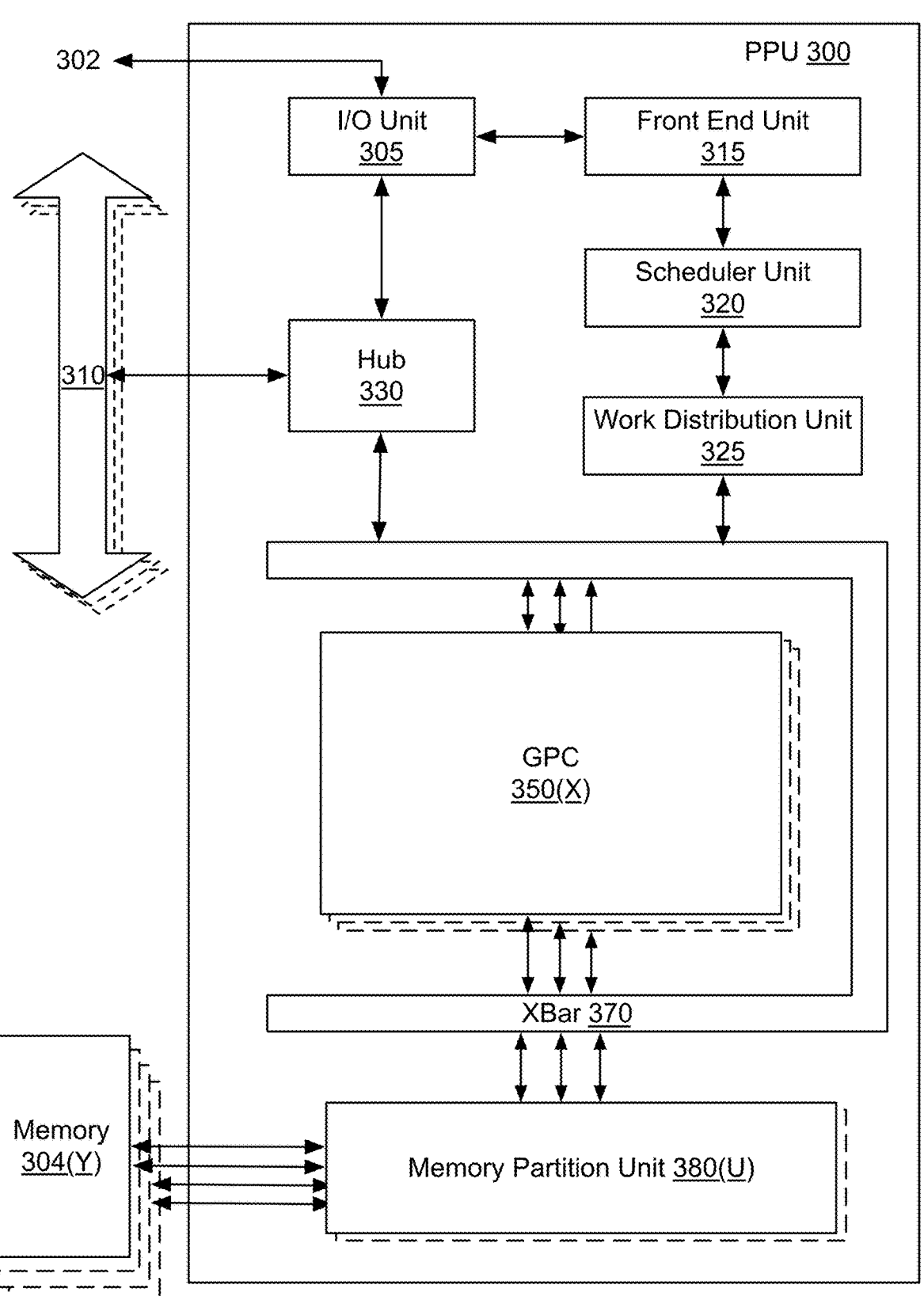
FIG. 3 illustrates an example parallel processing unit suitable for use in implementing some embodiments of the present disclosure.

FIG. 3 illustrates a parallel processing unit (PPU) 300, in accordance with an embodiment. The PPU 300 may be used to implement the stochastic texture unit 200. The PPU 300 may be used to implement one or more of the stochastic filter sample unit 210, texel storage 225, and texel combining unit 230 within the stochastic texture unit 200. In an embodiment, a processor such as the PPU 300 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, cloud computing, and machine learning applications. The PPU 300 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory 304 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5A.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 300 or CPU via the NVLink 310. In an embodiment, the PPU 300 includes a number U of memory partition units 380 that is equal to the number of separate and distinct memory devices of the memory 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 4C.

Figure 4A:
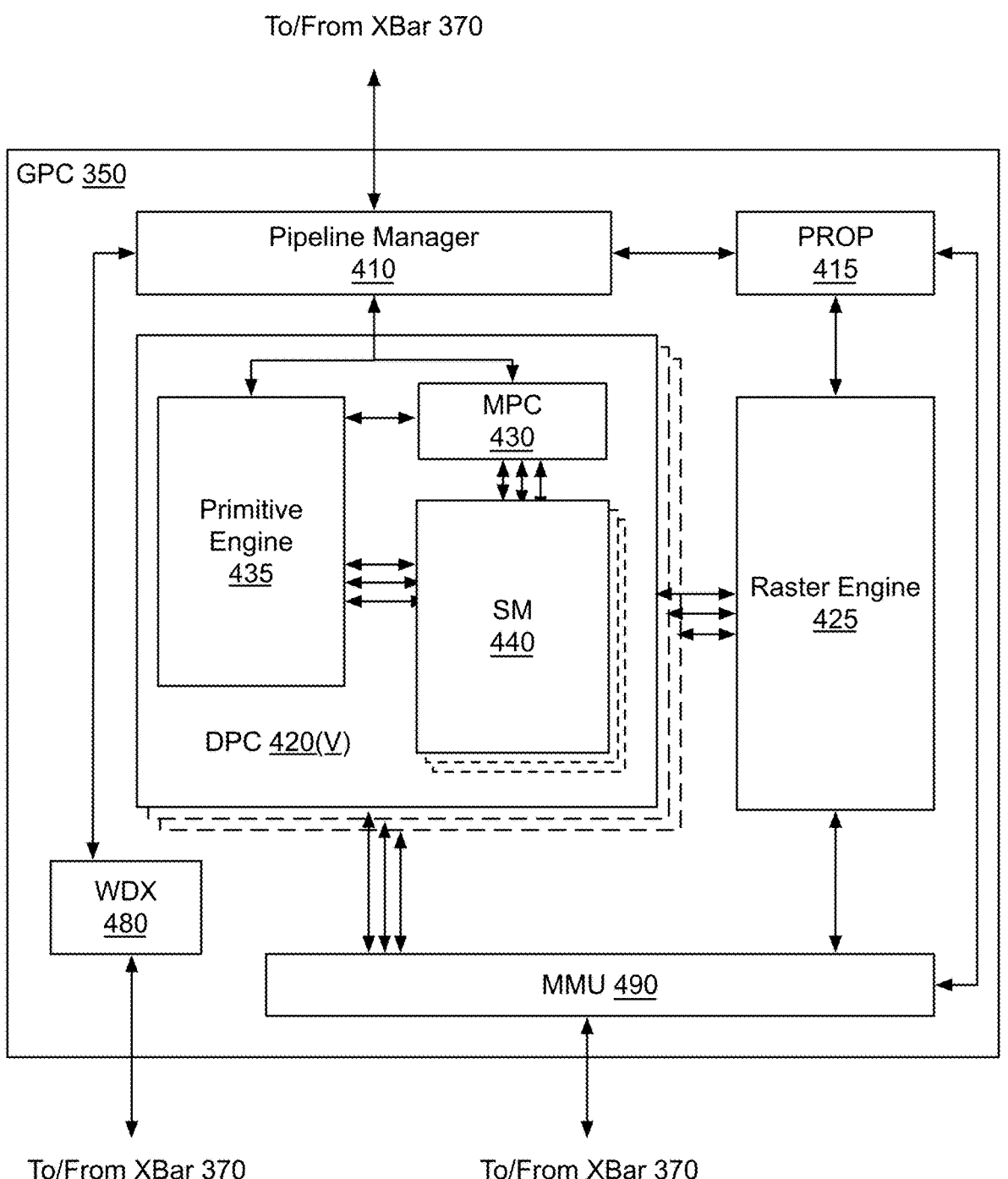
FIG. 4A illustrates an example general processing cluster within the parallel processing unit of FIG. 3, suitable for use in implementing some embodiments of the present disclosure.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
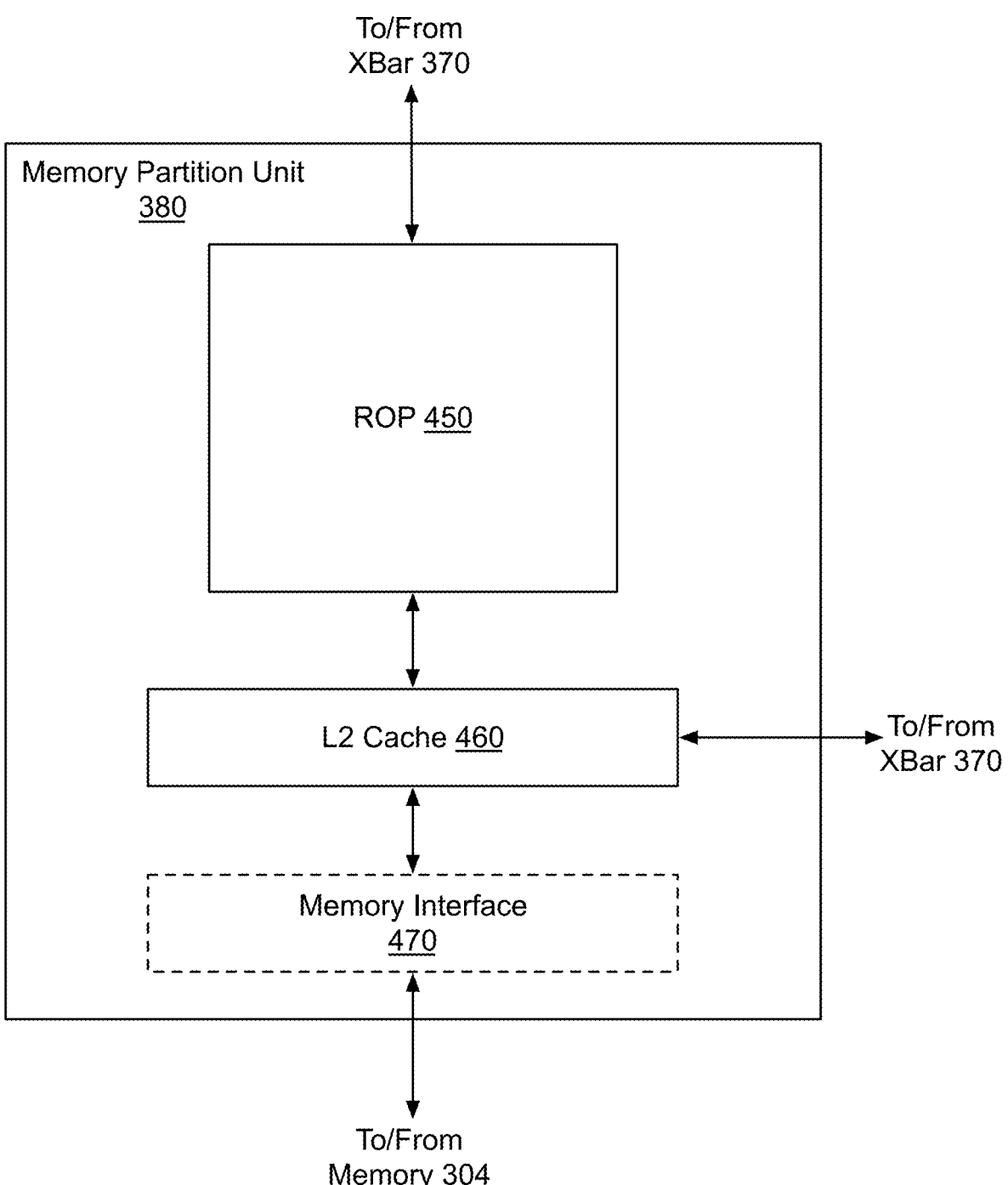
FIG. 4B illustrates an example memory partition unit of the parallel processing unit of FIG. 3, suitable for use in implementing some embodiments of the present disclosure.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 4C.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device of the memory 304. For example, PPU 300 may be connected to up to Y memory devices, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 4C:
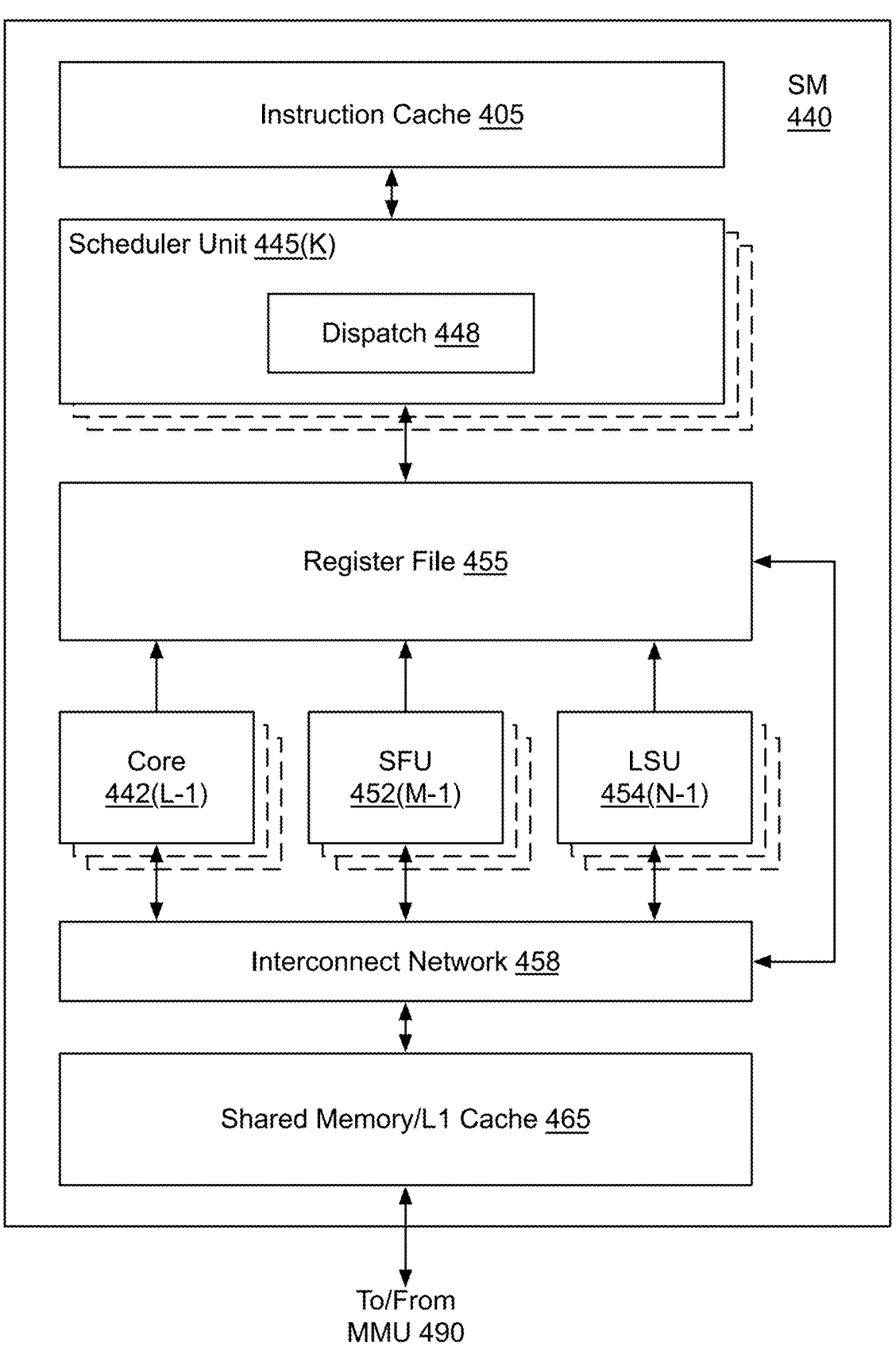
FIG. 4C illustrates an example of the streaming multiprocessor of FIG. 4A, suitable for use in implementing some embodiments of the present disclosure.

FIG. 4C illustrates the streaming multi-processor 440 of FIG. 4A, in accordance with an embodiment. As shown in FIG. 4C, the SM 440 includes an instruction cache 405, one or more (K) scheduler units 445, a register file 455, one or more processing cores 442, one or more special function units (SFUs) 452, one or more load/store units (LSUs) 454, an interconnect network 458, a shared memory/L1 cache 465.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 445 receives the tasks from the work distribution unit 325 and manages instruction scheduling for one or more thread blocks assigned to the SM 440. The scheduler unit 445 schedules thread blocks for execution as warps of parallel threads, where each thread block is allocated at least one warp. In an embodiment, each warp executes 32 threads. The scheduler unit 445 may manage a plurality of different thread blocks, allocating the warps to the different thread blocks and then dispatching instructions from the plurality of different cooperative groups to the various functional units (e.g., cores 442, SFUs 452, and LSUs 454) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 448 is configured to transmit instructions to one or more of the functional units. In the embodiment, the scheduler unit 445 includes two dispatch units 448 that enable two different instructions from the same warp to be dispatched during each clock cycle. In alternative embodiments, each scheduler unit 445 may include a single dispatch unit 448 or additional dispatch units 448.

Each SM 440 includes a register file 455 that provides a set of registers for the functional units of the SM 440. In an embodiment, the register file 455 is divided between each of the functional units such that each functional unit is allocated a dedicated portion of the register file 455. In another embodiment, the register file 455 is divided between the different warps being executed by the SM 440. The register file 455 provides temporary storage for operands connected to the data paths of the functional units.

Each SM 440 comprises L processing cores 442. In an embodiment, the SM 440 includes a large number (e.g., 128, etc.) of distinct processing cores 442. Each core 442 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 442 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 442. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 452 that perform special functions (e.g., attribute evaluation, reciprocal square root, and the like). In an embodiment, the SFUs 452 may include a tree traversal unit configured to traverse a hierarchical tree data structure. In an embodiment, the SFUs 452 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 465. The texture units implement texture operations such as filtering operations using mip-maps (e.g., texture maps of varying levels of detail). In an embodiment, each SM 340 includes two texture units.

Each SM 440 also comprises NLSUs 454 that implement load and store operations between the shared memory/L1 cache 465 and the register file 455. Each SM 440 includes an interconnect network 458 that connects each of the functional units to the register file 455 and the shared memory/L1 cache 465. In an embodiment, the interconnect network 458 is a crossbar that can be configured to connect any of the functional units to any of the registers in the register file 455 and memory locations in shared memory/L1 cache 465.

In an embodiment, the SFUs 452 are configured to perform stochastic texture filtering. In an embodiment, in response to a first instruction, a single texel value is returned from a block-compressed texture map. In an embodiment, a second instruction dequantizes texels (e.g., 8-bit to float32, or from a 5-6-5 bit RGB format to float32s). In an embodiment, a third instruction performs sRGB texture decoding. In an embodiment, a fourth instruction computes a texture level of detail given texture coordinate derivatives. In an embodiment, a fifth instruction selects a cube map face and texture coordinates given a 3D direction vector. In an embodiment, the LSUs 454 support fetching and decoding tightly packed and quantized "texels" (e.g., 2 bit or 4 bit, etc.), which might be used as texture representation by custom compressed texture formats (enabled by stochastic filtering), including but not limited to new compression formats using neural networks. In an embodiment, in response to executing a single instruction, the SM 440 causes quantized latent representations (e.g., neural textures) to be fetched and decoded, with the decoded representations sent to an independent Tensor unit or the cores 442, for processing. In an embodiment, a sixth instruction performs stochastic bilinear filtering by taking the (s,t) texture coordinates and a random sample in [0,1] and returning integer (s,t) coordinates sampled stochastically.

The shared memory/L1 cache 465 is an array of on-chip memory that allows for data storage and communication between the SM 440 and the primitive engine 435 and between threads in the SM 440. In an embodiment, the shared memory/L1 cache 465 comprises 128 KB of storage capacity and is in the path from the SM 440 to the memory partition unit 380. The shared memory/L1 cache 465 can be used to cache reads and writes. One or more of the shared memory/L1 cache 465, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 465 enables the shared memory/L1 cache 465 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread 1D in the calculation to ensure each thread generates unique results, using the SM 440 to execute the program and perform calculations, shared memory/L1 cache 465 to communicate between threads, and the LSU 454 to read and write global memory through the shared memory/L1 cache 465 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices. The graphics card may be configured to interface with a PCIe slot on a motherboard of a desktop computer. In yet another embodiment, the PPU 300 may be an integrated graphics processing unit (iGPU) or parallel processor included in the chipset of the motherboard. In yet another embodiment, the PPU 300 may be realized in reconfigurable hardware. In yet another embodiment, parts of the PPU 300 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
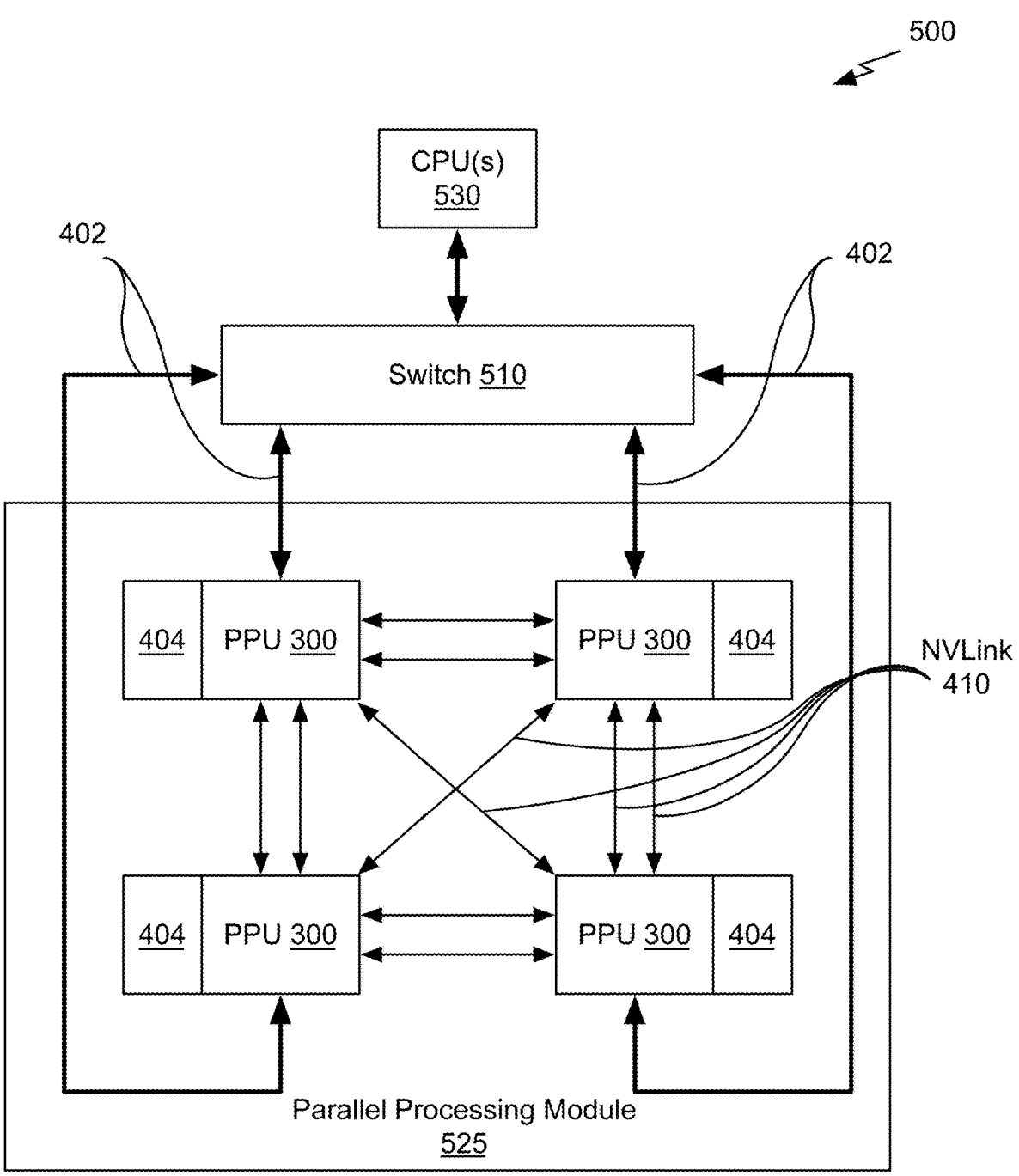
FIG. 5A is a conceptual diagram of a processing system implemented using the PPU of FIG. 3, suitable for use in implementing some embodiments of the present disclosure.

FIG. 5A is a conceptual diagram of a processing system 500 implemented using the PPU 300 of FIG. 3, in accordance with an embodiment. The exemplary system 500 may be configured to implement the method 250 shown in FIG. 2D. The processing system 500 includes a CPU 530, switch 510, and multiple PPUs 300, and respective memories 404.

Figure 5B:
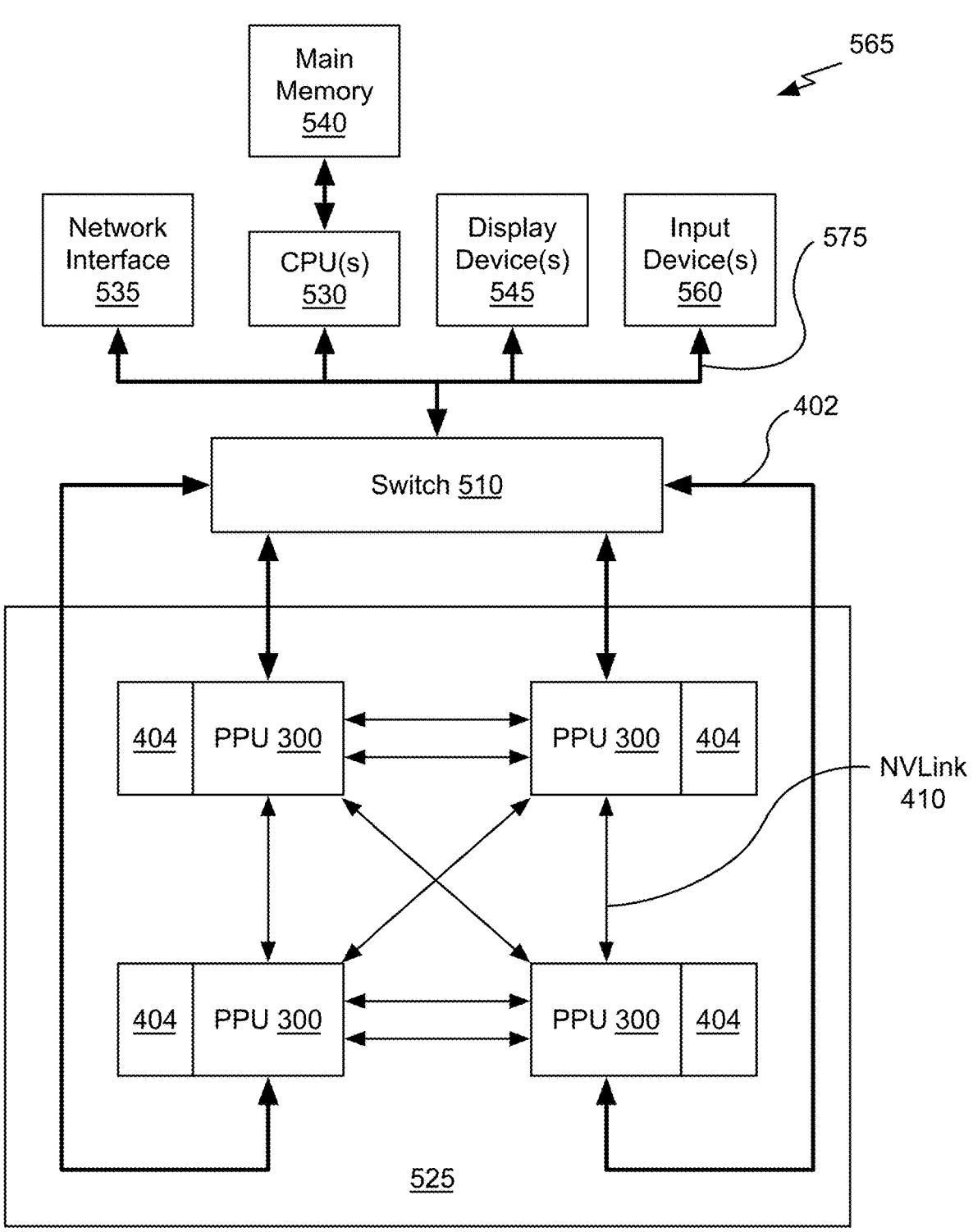
FIG. 5B illustrates an exemplary system in which the various architecture and/or functionality of the various previous embodiments may be implemented.

The NVLink 410 provides high-speed communication links between each of the PPUs 300. Although a particular number of NVLink 410 and interconnect 402 connections are illustrated in FIG. 5B, the number of connections to each PPU 300 and the CPU 530 may vary. The switch 510 interfaces between the interconnect 402 and the CPU 530. The PPUs 300, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 300 and the CPU 530 and the switch 510 interfaces between the interconnect 402 and each of the PPUs 300. The PPUs 300, memories 404, and interconnect 402 may be situated on a single semiconductor platform to form a parallel processing module 525. In yet another embodiment (not shown), the interconnect 402 provides one or more communication links between each of the PPUs 300 and the CPU 530 and the switch 510 interfaces between each of the PPUs 300 using the NVLink 410 to provide one or more high-speed communication links between the PPUs 300. In another embodiment (not shown), the NVLink 410 provides one or more high-speed communication links between the PPUs 300 and the CPU 530 through the switch 510. In yet another embodiment (not shown), the interconnect 402 provides one or more communication links between each of the PPUs 300 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 300 includes six NVLink 410 interfaces (as shown in FIG. 5A, five NVLink 410 interfaces are included for each PPU 300). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 300 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 300 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method 250 shown in FIG. 2D.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5C:
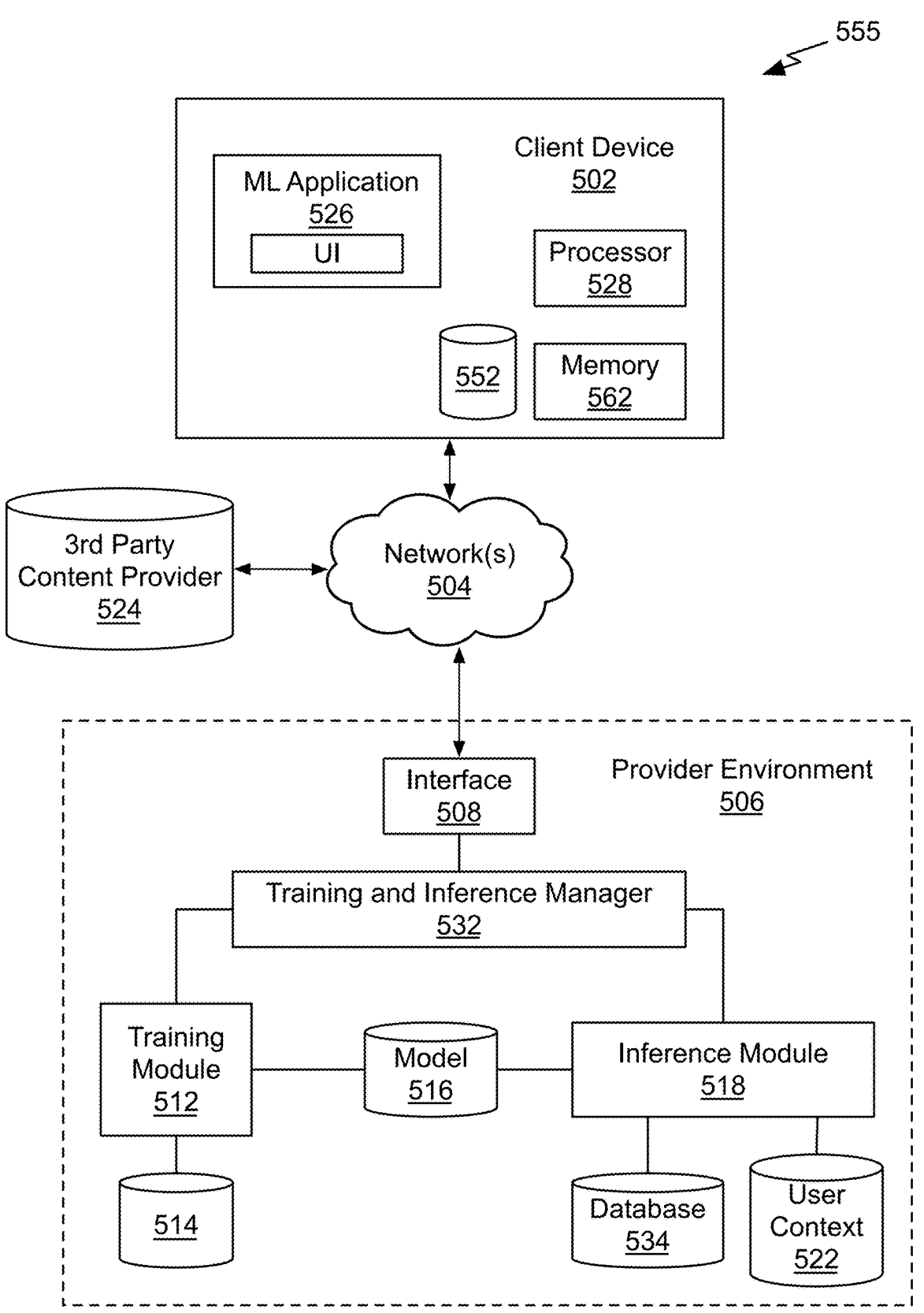
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 300 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In an embodiment, the set of training data may be used in a generative adversarial training configuration to train a generator neural network.

In at least one embodiment, training data can include images of at least one human subject, avatar, or character for which a neural network is to be trained. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 300 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6A:
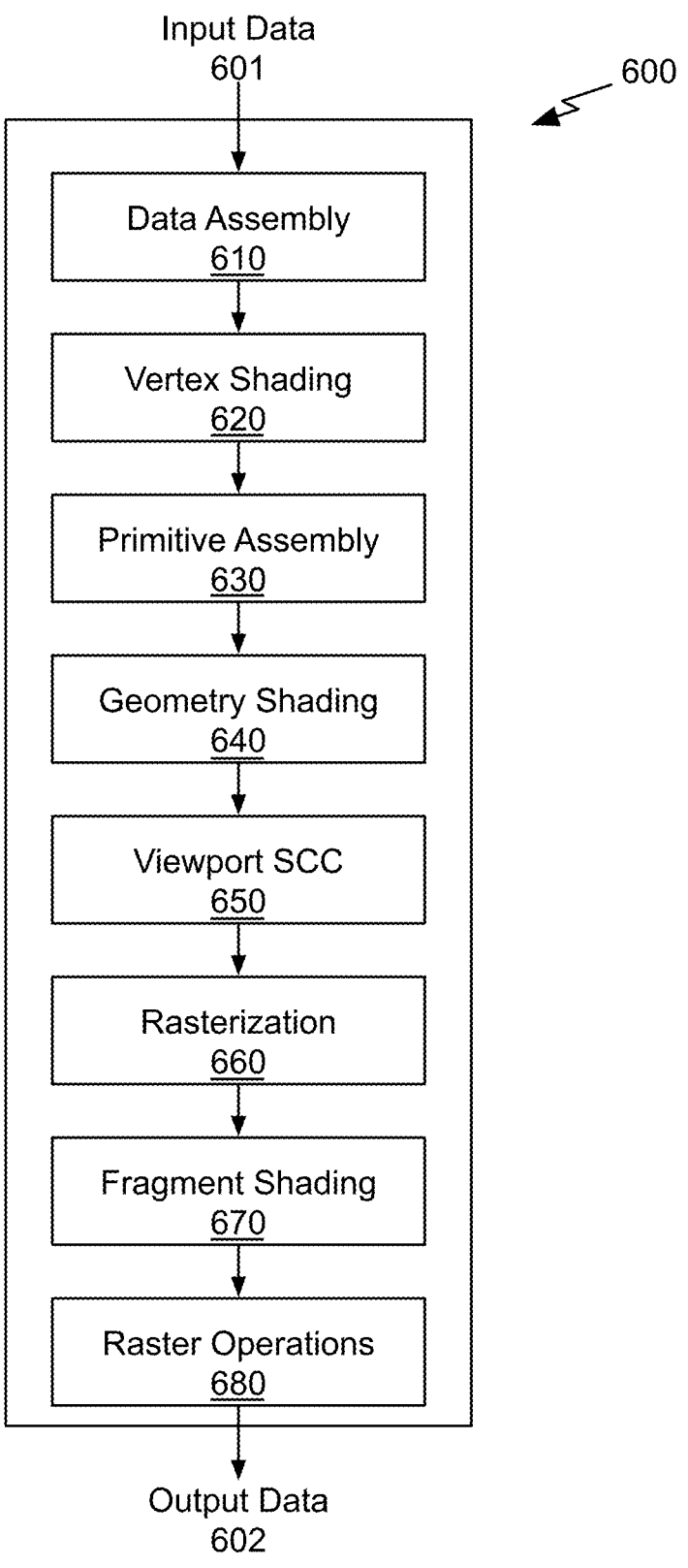
FIG. 6A is a conceptual diagram of a graphics processing pipeline implemented by the PPU of FIG. 3 suitable for use in implementing some embodiments of the present disclosure.

FIG. 6A is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6A, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., $<x, y, z, w>$) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the processing unit within the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one processing unit (or multiple processing units). The device driver (or the initial kernel executed by the PPU 300) may also launch other kernels on the PPU 300 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 300. It will be appreciated that results from one kernel may be processed by one or more intervening fixed function hardware units before being processed by a subsequent kernel on a processing unit.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Streaming System

Figure 6B:
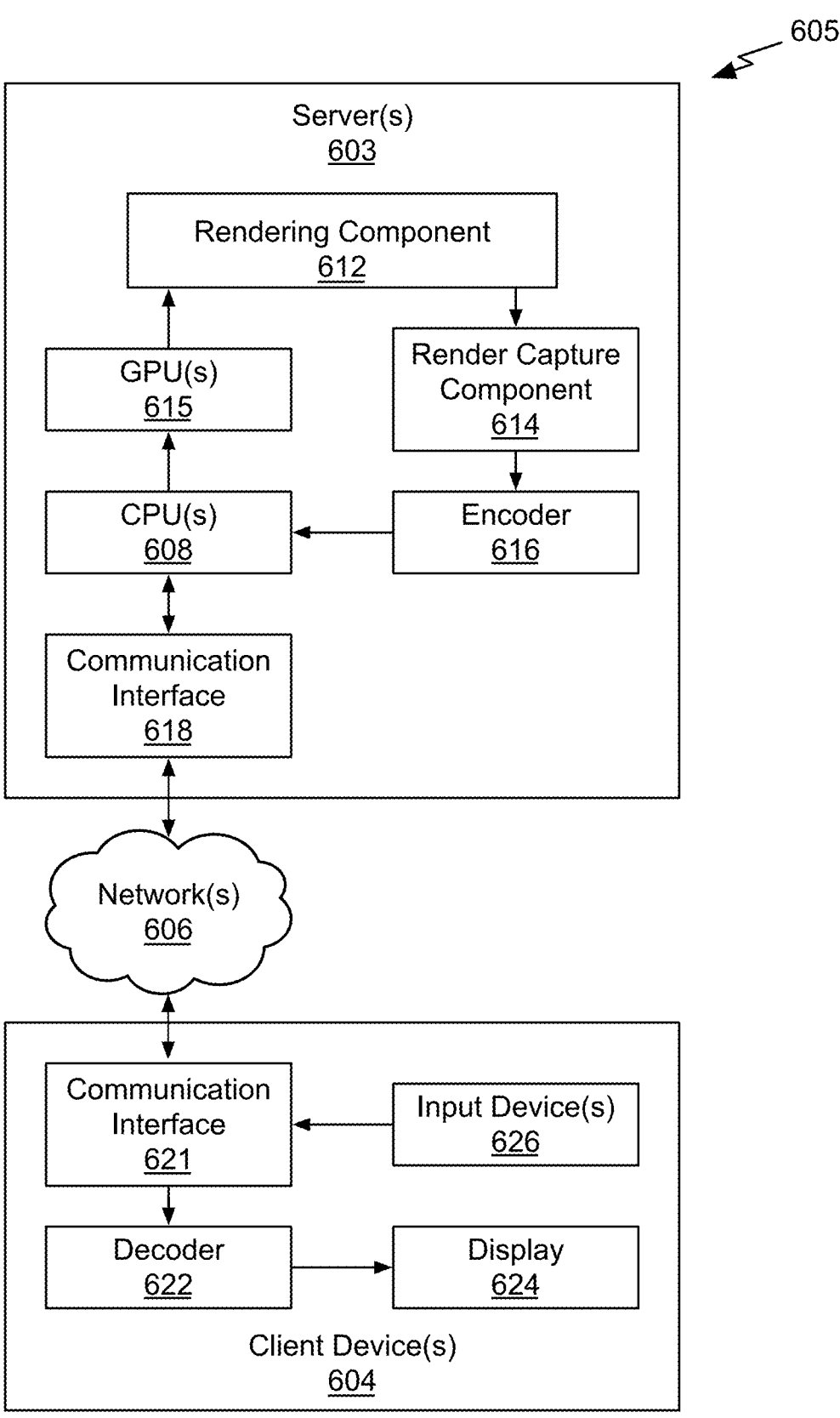
FIG. 6B illustrates an exemplary streaming system suitable for use in implementing some embodiments of the present disclosure.

FIG. 6B is an example system diagram for a streaming system 605, in accordance with some embodiments of the present disclosure. FIG. 6B includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In an embodiment, the streaming system 605 is a game streaming system and the server(s) 603 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A system, comprising:
a memory that stores a texture map comprising texels associated with a plurality of integer texture coordinates; and
a processor that is connected to the memory, wherein the processor is configured to perform stochastic texture filtering by:
obtaining texture coordinates associated with rendered geometry that intersects a pixel;
generating, for a discrete texture filter, sample weight probabilities corresponding to integer texture coordinates that are calculated from the texture coordinates;
selecting a single texel stored in the texture map using a stochastic value and the sample weight probabilities; and
producing a filtered color for the pixel based on the single texel.

2. The system of claim 1, further comprising selecting at least one additional texel stored in the texture map using an additional stochastic value.

3. The system of claim 2, wherein a number of the at least one additional texel varies based on a frame rate.

4. The system of claim 2, wherein the producing comprises averaging the single texel with the at least one additional texel without applying the sample weight probabilities to the single texel or the at least one additional texel.

5. The system of claim 1, further comprising:
in response to detecting a disocclusion, selecting an additional texel stored in the texture map using an additional stochastic value; and
combining the additional texel with the texel to produce the filtered color.

6. The system of claim 1, further comprising dynamically adjusting, based on a target frame rate, a number of texels selected from the texture map for the pixel using additional stochastic values and the sample weight probabilities.

7. The system of claim 1, wherein a driver replaces texture processing code with instructions that cause the processor to perform the stochastic texture filtering.

8. The system of claim 1, wherein the stochastic value is a low-discrepancy random number or is selected from a particular distribution.

9. The system of claim 1, wherein the stochastic value is provided by a user, hardware-generated, or read from a table.

10. The system of claim 1, wherein producing the filtered color comprises combining multiple texels for the pixel over time.

11. The system of claim 1, wherein the discrete texture filter comprises one of a cubic B-spline polynomial, Mitchell polynomial, Gaussian, parametric, or program.

12. The system of claim 1, wherein at least one of the obtaining, generating, selecting, or producing are performed on a server or in a data center to generate an image, and the image is streamed to a user device.

13. The system of claim 1, wherein at least one of the obtaining, generating, selecting, or producing are performed within a cloud computing environment.

14. The system of claim 1, wherein at least one of the obtaining, generating, selecting, or producing are performed for training, testing, or certifying a neural network employed in a machine, robot, or autonomous vehicle.

15. The system of claim 1, wherein the processor comprises a graphics processing unit and at least one of the obtaining, generating, selecting, or producing are performed on a virtual machine comprising a portion of the processor.

16. The system of claim 1, further comprising:
obtaining additional texture coordinates associated with an additional pixel; and
based on a sampling mode, setting a filtered color for the additional pixel to an average value of the texture map.

17. The system of claim 1, wherein the filtered color is set to the single texel without applying one or more of the sample weight probabilities or any interpolation weights to the single texel.

18. A non-transitory computer-readable media storing computer instructions for stochastic texture filtering that, when executed by one or more processors, cause the one or more processors to perform the steps of:
obtaining texture coordinates associated with rendered geometry that intersects a pixel,
generating, for a discrete texture filter, sample weight probabilities corresponding to integer texture coordinates that are calculated from the texture coordinates and that are associated with a texture map comprising texels;
selecting a single texel stored in the texture map using a stochastic value and the sample weight probabilities; and
producing a filtered color for the pixel based on the single texel.

19. The non-transitory computer-readable media of claim 18, further comprising:
in response to detecting a disocclusion, selecting an additional texel stored in the texture map using an additional stochastic value, and
combining the additional texel with the texel to produce the filtered color.

20. The non-transitory computer-readable media of claim 18, further comprising:
determining that the texture map is designated as safe for stochastic filtering; and
enabling stochastic filtering for the texture map.

21. The non-transitory computer-readable media of claim 18, wherein a driver replaces texture processing code with the instructions for stochastic texture filtering.

22. A method for stochastic texture filtering, comprising:
obtaining texture coordinates associated with rendered geometry that intersects a pixel;
generating, for a discrete texture filter, sample weight probabilities corresponding to integer texture coordinates that are calculated from the texture coordinates and that are associated with a texture map comprising texels;

selecting a single texel stored in the texture map using a stochastic value and the sample weight probabilities; and producing a filtered color for the pixel based on the single texel.

23. The method of claim 22, wherein the filtered color is set to the single texel without applying one or more of the sample weight probabilities to the single texel or any interpolation weights to the single texel.

* * * * *